(12) United States Patent
Tong et al.

(10) Patent No.: US 11,447,283 B2
(45) Date of Patent: Sep. 20, 2022

(54) PRODUCT PROCESSING APPARATUS

(71) Applicant: ISHIDA CO., LTD., Kyoto (JP)

(72) Inventors: Yuchuan Tong, Ritto (JP); Ryoichi Sato, Ritto (JP); Shinji Koike, Ritto (JP); Motoki Takayama, Ritto (JP); Naoki Furuya, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 24 days.

(21) Appl. No.: 16/631,154

(22) PCT Filed: Jun. 7, 2018

(86) PCT No.: PCT/JP2018/021851
§ 371 (c)(1),
(2) Date: Jan. 14, 2020

(87) PCT Pub. No.: WO2019/035265
PCT Pub. Date: Feb. 21, 2019

(65) Prior Publication Data
US 2020/0223574 A1    Jul. 16, 2020

(30) Foreign Application Priority Data

Aug. 18, 2017  (JP) .............................. JP2017-158211

(51) Int. Cl.
*B65B 59/00* (2006.01)
*B65B 9/207* (2012.01)
(Continued)

(52) U.S. Cl.
CPC ............ *B65B 59/003* (2019.05); *B65B 9/207* (2013.01); *B65B 41/16* (2013.01); *B65B 57/00* (2013.01); *B65B 59/00* (2013.01); *B65B 61/025* (2013.01)

(58) Field of Classification Search
CPC ....... B65B 59/003; B65B 9/207; B65B 41/16; B65B 57/00; B65B 61/025; B65B 59/00–04
See application file for complete search history.

(56) References Cited

U.S. PATENT DOCUMENTS 7,216,010 B2 * 5/2007 Nishimura .......... G01G 19/393
                                                               345/173
2004/0153804 A1   8/2004 Blevins et al.
(Continued)

FOREIGN PATENT DOCUMENTS

JP    S60-110631 A    6/1985
JP    2003-11926 A    1/2003
(Continued)

OTHER PUBLICATIONS

The Search Report from the corresponding International Patent Application No. PCT/JP2018/021851 dated Aug. 21, 2018.
(Continued)

*Primary Examiner* — Anna K Kinsaul
*Assistant Examiner* — Himchan Song
(74) *Attorney, Agent, or Firm* — Shinjyu Global IP

(57) ABSTRACT

A product processing apparatus that performs packaging or box packing of products is disclosed. The product processing apparatus includes a storage component and a display component. The storage component is configured to store settings relating to the packaging or the box packing of the products. The display component is configured to display adjustment-requiring parts that requires adjustment in the product processing apparatus when changing the settings.

8 Claims, 16 Drawing Sheets

(51) Int. Cl.
*B65B 41/16* (2006.01)
*B65B 57/00* (2006.01)
*B65B 61/02* (2006.01)

(56) References Cited

U.S. PATENT DOCUMENTS

| | | | |
|---|---|---|---|
| 2007/0168059 A1* | 7/2007 | Eckert | G05B 19/409 700/83 |
| 2008/0091299 A1* | 4/2008 | Yoshikawa | B65B 9/213 700/242 |
| 2008/0228315 A1* | 9/2008 | Wendner | G05B 15/02 700/17 |
| 2009/0044491 A1* | 2/2009 | De Pietra | B65B 57/00 53/507 |
| 2015/0197360 A1* | 7/2015 | Lancaster, III | B65B 11/025 53/461 |
| 2016/0096645 A1* | 4/2016 | Lancaster, III | B65B 57/18 53/64 |
| 2016/0098171 A1* | 4/2016 | Lancaster, III | B65B 59/003 715/835 |
| 2019/0291908 A1* | 9/2019 | Fujihara | B65B 57/08 |
| 2020/0283176 A1* | 9/2020 | Lancaster, III | B65B 57/18 |

FOREIGN PATENT DOCUMENTS

| | | |
|---|---|---|
| JP | 2006-36246 A | 2/2006 |
| WO | 2016/189969 A1 | 12/2016 |

OTHER PUBLICATIONS

The Preliminary Report on Patentability (with Written Opinion) from the corresponding International Patent Application No. PCT/JP2018/021851 dated Feb. 18, 2020.
The Search Report from the corresponding European Patent Application No. 18845963.0 dated Apr. 12, 2021.
The Examination Report No. 2 from the corresponding Australian Patent Application No. 2018316918 dated Apr. 20, 2021.
The Office Action from the corresponding Japanese Patent Application No. 2017-158211 dated Nov. 9, 2021.

* cited by examiner

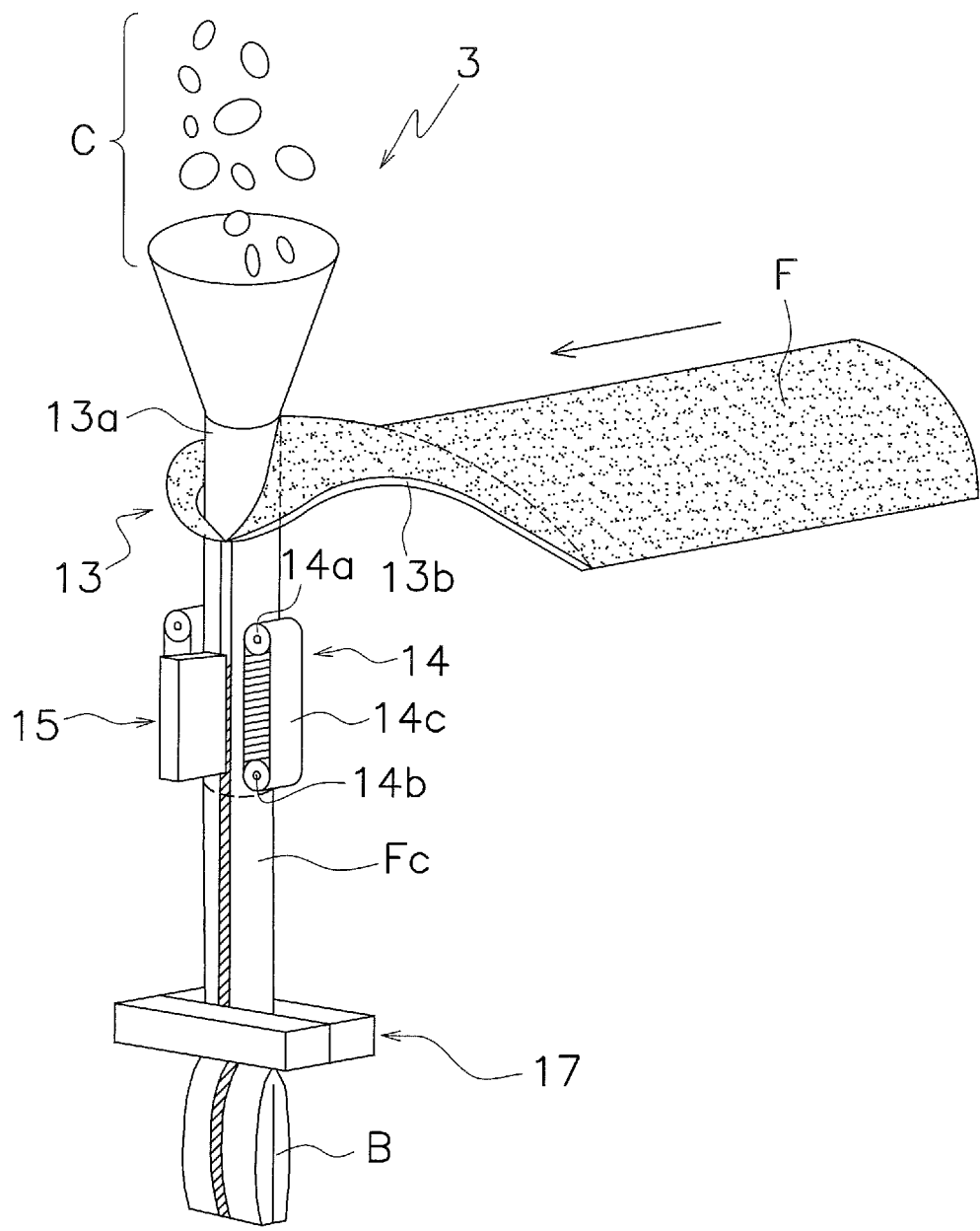
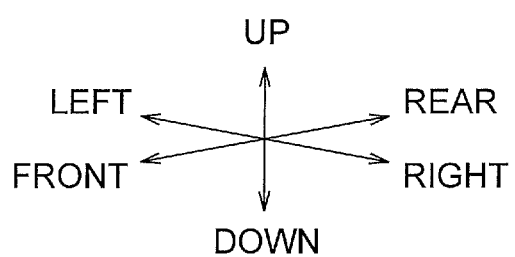
FIG. 2

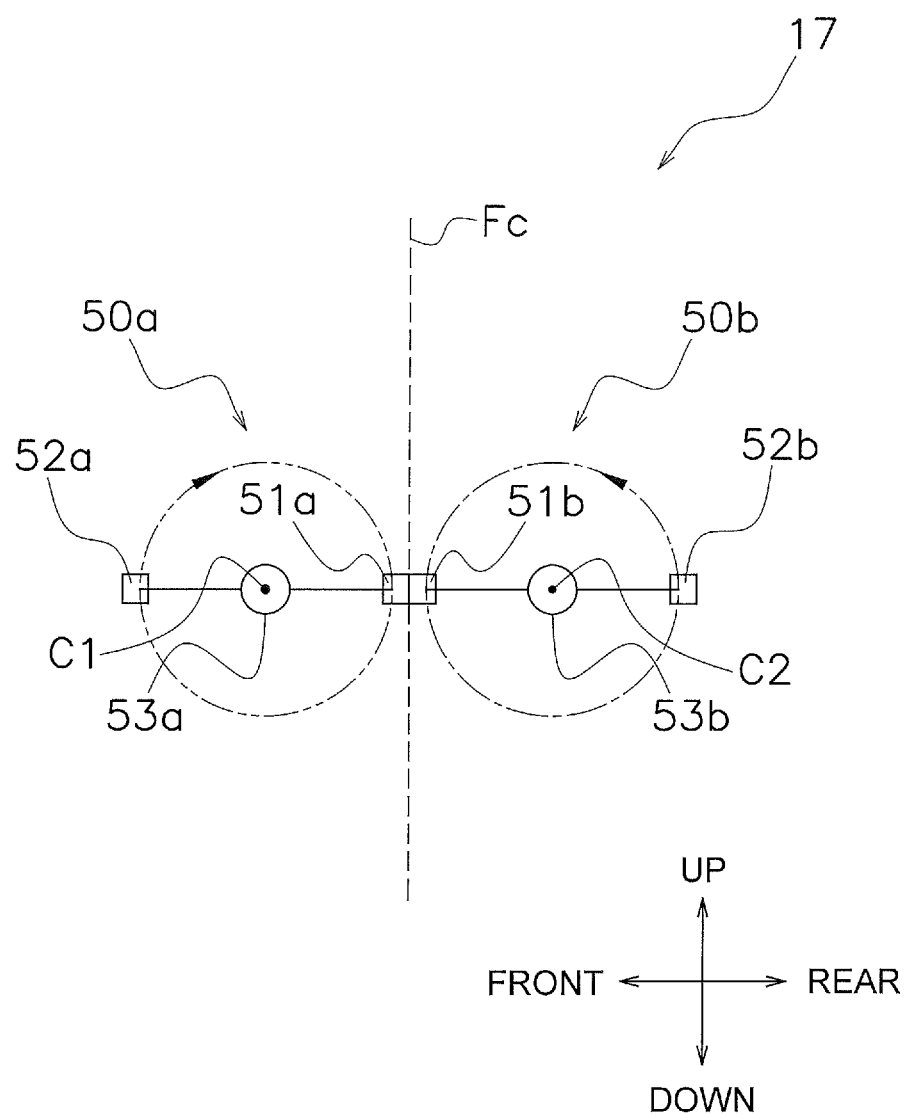
F I G. 3

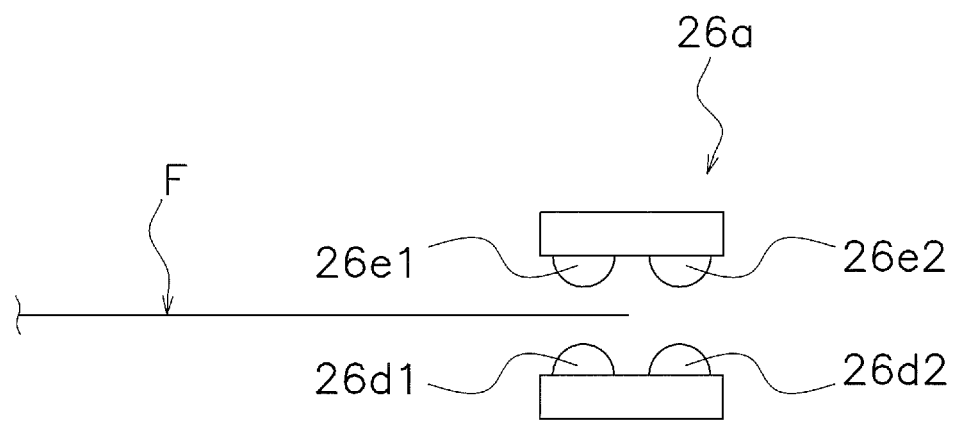
F I G. 5

| RESERVATION NUMBER | PRODUCT NAME | CAPACITY (bmp) | BAG WIDTH (mm) | BAG LENGTH (mm) |
|---|---|---|---|---|
| 4 | TEST_04 | 120 | 133 | 150 |

A1

DB

RESERVATION LIST

| RESERVATION NUMBER | DATE AND TIME | PRODUCT NAME | CAPACITY (bmp) | BAG WIDTH (mm) | BAG LENGTH (mm) |
|---|---|---|---|---|---|
| 4 | 2017/06/29 17:13 | TEST_04 | 120 | 133 | 150 |
| 3 | 2017/06/27 16:06 | TEST_03 | 120 | 133 | 150 |
| 1 | 2017/06/27 12:45 | TEST_01 | 20 | 133 | 300 |
| 2 | 2017/06/27 14:26 | TEST_02 | 150 | 133 | 200 |

R1, R2, R3, R4, A2

72a  72b

SEARCH   SWITCH   NEW   RETRIEVE
RETURN   COPY     DELETE   IMPORT

A3

F I G. 8

| RESERVATION NUMBER | PRODUCT NAME | CAPACITY (bmp) | BAG WIDTH (mm) | BAG LENGTH (mm) |
|---|---|---|---|---|
| 4 | TEST_04 | 120 | 133 | 150 |

RESERVATION LIST

| RESERVATION NUMBER | DATE AND TIME | PRODUCT NAME | CAPACITY (bmp) | BAG WIDTH (mm) | BAG LENGTH (mm) |
|---|---|---|---|---|---|
| 4 | 2017/06/29 17:13 | TEST_04 | 120 | 133 | 150 |
| 3 | 2017/06/27 16:06 | TEST_03 | 120 | 133 | 150 |
| 1 | 2017/06/27 12:45 | TEST_01 | 20 | 133 | 300 |
| 2 | 2017/06/27 14:26 | TEST_02 | 150 | 133 | 200 |

SEARCH  SWITCH  NEW  RETRIEVE

RETURN  COPY  DELETE  IMPORT

F I G. 9

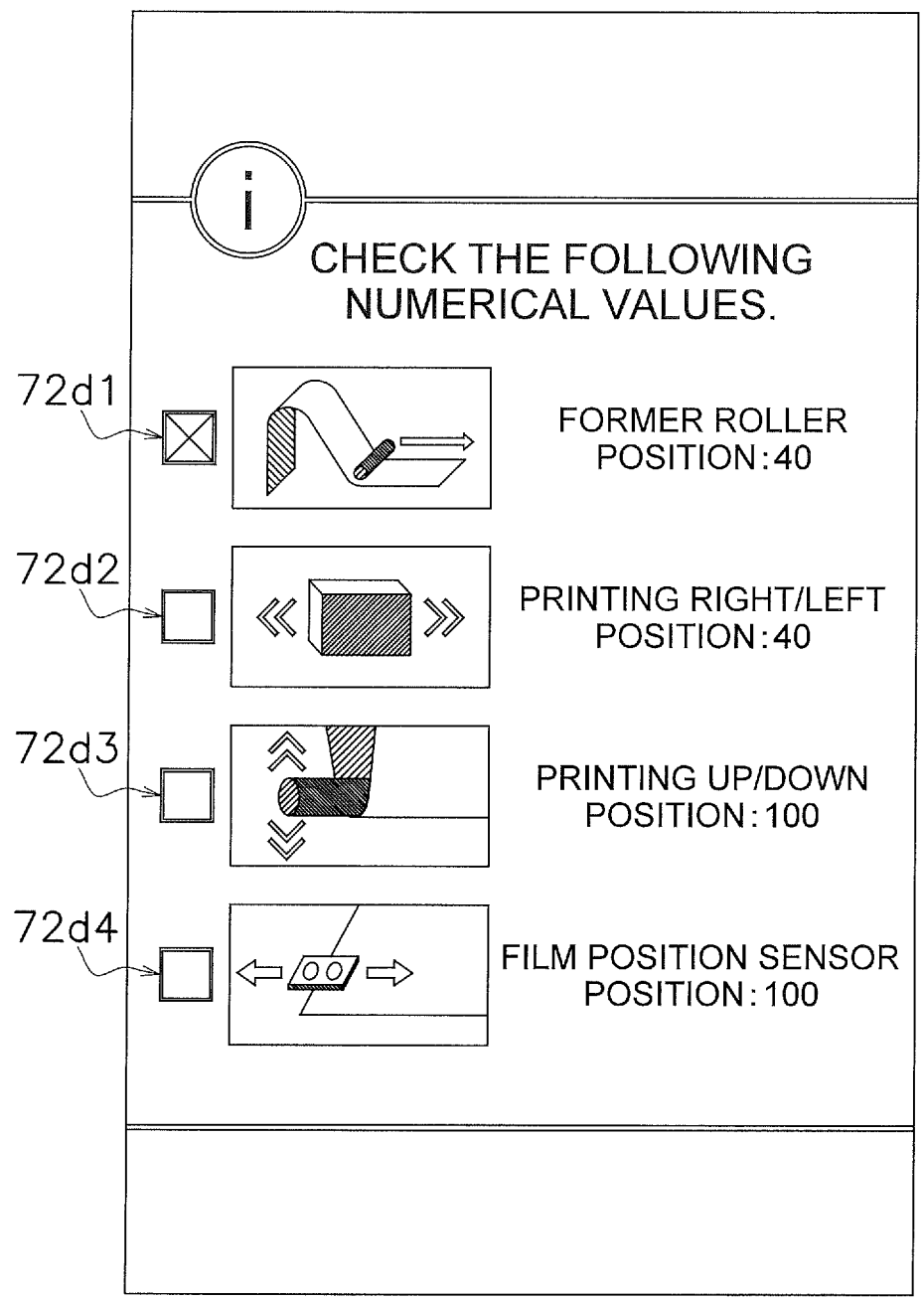
F I G. 1 5

CHECK THE FOLLOWING NUMERICAL VALUES.
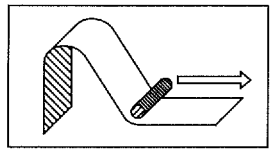
FORMER ROLLER POSITION: 40
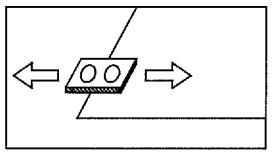
FILM POSITION SENSOR POSITION: 100
FIG. 16

PRODUCT PROCESSING APPARATUS

CROSS-REFERENCE TO RELATED APPLICATIONS

This application is the U.S. National Phase of International Application No. PCT/JP2018/021851, filed Jun. 7, 2018. That application claims priority to Japanese Patent Application No. 2017-158211, filed Aug. 18, 2017. Both of those applications are incorporated by reference herein in their entireties.

TECHNICAL FIELD

The present invention relates to a product processing apparatus for packaging products in film or the like or box packing products into cardboard boxes or the like.

BACKGROUND ART

Bag-making and packaging machines for packaging products in film or the like have mechanisms requiring manual adjustment when switching a setting relating to the packaging of the products. Examples of such mechanisms include a roller that guides the film paid out from a film roll and a printing device for printing predetermined information on the film that is being conveyed. For example, in the case of a bag-making and packaging machine having a printing device such as disclosed in JP-A No. 2006-36246, when switching the setting, the worker has manually adjusted the position of the head of the printing device. Conventionally, the worker has written down on a paper memo, for example, the mechanisms requiring manual adjustment when switching the setting and performed the required adjustments while referring to the memo.

BRIEF SUMMARY

However, the method of using a paper memo to make the adjustments carries with it the concern that if the worker loses the memo, rechecking the mechanisms that need to be manually adjusted will consume time, and also carries with it the concern that the memo will get inside the bag-making and packaging machine and cause problems. Furthermore, if the worker makes the adjustments without using a memo, the worker needs to rely on his/her own memory to adjust the mechanisms that need to be manually adjusted, so there is the concern a part that should be adjusted will escape the worker's memory. The above problems have the potential to occur even with a box packing apparatus for box packing products into cardboard boxes or the like.

It is an object of the present invention to provide a product processing apparatus that has the function of preventing a user from forgetting to adjust a part that needs to be manually adjusted when switching a setting.

A product processing apparatus pertaining to the invention is an apparatus that performs packaging or box packing of products, and has a storage component and a display component. The storage component stores settings relating to the packaging or the box packing of the products. The display component displays adjustment-requiring parts requiring adjustment in the apparatus when changing the settings relating to the packaging or the box packing of the products.

This product processing apparatus has the function of displaying on a display or the like and notifying the user of information relating to parts requiring manual adjustment when switching the settings relating to the packaging or the box packing of the products. Consequently, this product processing apparatus has the function of preventing the user from forgetting to adjust a part that needs to be manually adjusted when switching the settings relating to the packaging or the box packing of the products.

Furthermore, it is preferred that when changing the settings, the display component further display setting values for the adjustment-requiring parts after the change in the settings.

In this case, when changing the settings relating to the packaging or the box packing of the products, new setting values for the parts requiring adjustment are displayed. Because of this, a memo or the like in which the new setting values are written down becomes unnecessary.

Furthermore, it is preferred that the product processing apparatus further have a setting value input component for inputting the setting values per each of the settings.

In this case, when registering (reserving) new settings relating to the packaging or the box packing of the products, by inputting beforehand the setting values for the parts requiring adjustment, the user can make the appropriate adjustments without referring to a memo or the like even if the user later forgets the setting values.

Furthermore, it is preferred that when changing the settings, the display component display, in a manner different from other of the adjustment-requiring parts, the adjustment-requiring parts for which the setting values differ between before changing and after changing the settings.

In this case, for example, by displaying only parts requiring a change in their setting values and not displaying the other parts or faintly displaying the parts not requiring a change in their setting values, the product processing apparatus can notify the user, in a way that is easy to understand, of the parts requiring a change in their setting values.

Furthermore, it is preferred that the product processing apparatus further have an adjustment complete input component for inputting that adjustment of the adjustment-requiring parts has been completed.

In this case, the user can relay to the apparatus that the user has completed the adjustment of the adjustment-requiring parts and confirm the adjustment work. For that reason, the product processing apparatus can start the packaging or the box packing of the products after the adjustment work by the user has reliably ended.

Furthermore, it is preferred that the product processing apparatus further have a display manner changing component for causing the display component to display, in a manner different from the adjustment-requiring parts for which adjustment has not been completed, the adjustment-requiring parts for which adjustment has been completed when changing the settings.

In this case, in a case where there is more than one part requiring adjustment, it can be made easier for the user to check, each time adjustment of a part is completed, that part and see the progress of the work.

Furthermore, the product processing apparatus is an apparatus that packages the products in film, and has a conveyance unit, a roller, and a printing unit. The conveyance unit conveys the film in its longitudinal direction. The roller guides the film that is being conveyed. The printing unit prints predetermined information on the film that is being conveyed. The display component displays, as the adjustment-requiring parts, at least one of the position of the roller, the width direction position of the film that is being conveyed, and the position where the printing unit prints on the film.

The product processing apparatus pertaining to the invention has the function of preventing a user from forgetting to adjust a part that needs to be manually adjusted when switching a setting relating to the packaging or the box packing of products.

BRIEF DESCRIPTION OF DRAWINGS

FIG. 2 is a perspective view showing the general configuration of a bag-making and packaging unit 3.

FIG. 3 is a general side view showing a transverse sealing mechanism 17 as seen from the right side of FIG. 2.

FIG. 5 is a drawing for describing the mechanism by which a film position sensor 26a detects positional misalignment.

FIG. 8 is an example of a switching screen displayed on a liquid crystal display 6.

FIG. 9 is an example of the switching screen in a state where a "Switch" button 72a is valid.

FIG. 15 is a drawing for describing the function of a display manner changing component 75 in example modification A.

FIG. 16 is a drawing for describing the function of a display component 72 in example modification B.

DESCRIPTION OF EMBODIMENTS

An embodiment of the invention will be described with reference to the drawings. The embodiment described below is a specific example of the invention and is not intended to limit the technical scope of the invention.

(1) CONFIGURATION OF BAG-MAKING AND PACKAGING MACHINE

A product processing apparatus pertaining to the invention is an apparatus that performs packaging or box packing of products. In this embodiment, a bag-making and packaging machine for packaging in film and bag packing contents such as food products will be described as the product processing apparatus.

Figure 1:
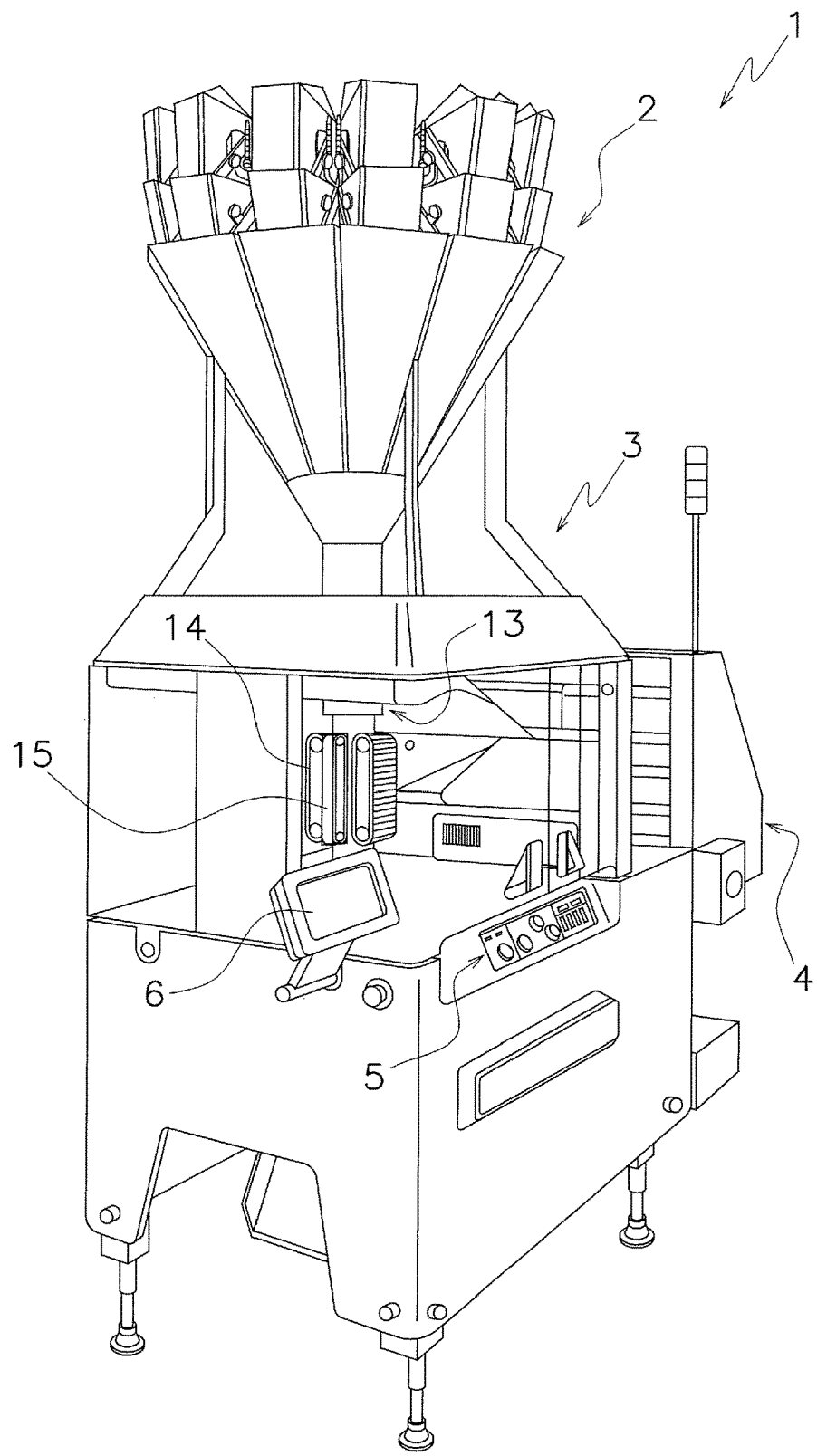
FIG. 1 is a perspective view of a bag-making and packaging machine 1 that is an embodiment of the invention.

FIG. 1 is a perspective view of a bag-making and packaging machine 1 that is an embodiment of the invention. The bag-making and packaging machine 1 is mainly configured from a combination weighing unit 2, a bag-making and packaging unit 3, a film supply unit 4, operation switches 5, a liquid crystal display 6, and a control device 7.

The combination weighing unit 2 is disposed above the bag-making and packaging unit 3. The combination weighing unit 2 weighs, with plural weighing hoppers, the weights of contents and combines the values of the weights that have been weighed by each weighing hopper so as to reach a predetermined total weight. The combination weighing unit 2 discharges downward and supplies to the bag-making and packaging unit 3 the contents having the combined predetermined total weight.

The bag-making and packaging unit 3 seals in bags and packages the contents in accordance with the timing when the contents are supplied from the combination weighing unit 2. The detailed configuration and actions of the bag-making and packaging unit 3 will be described later.

The film supply unit 4 is installed adjacent to the bag-making and packaging unit 3 and supplies to the bag-making and packaging unit 3 a film that becomes formed into the bags. A film roll into which the film is wound is set in the film supply unit 4. The film supply unit 4 pays out the film from the film roll. The detailed configuration and actions of the film supply unit 4 will be described later.

The operation switches 5 and the liquid crystal display 6 are attached to the front of the bag-making and packaging machine 1 body. The liquid crystal display 6 is a touch panel display disposed in a position where the operator of the operation switches 5 can see it. The operation switches 5 and the liquid crystal display 6 function as input devices that receive instructions with respect to the bag-making and packaging machine 1 and settings relating to the bag-making and packaging machine 1. The liquid crystal display 6 functions as an output device that displays information relating to the bag-making and packaging machine 1.

The control device 7 is mainly configured from a CPU, a ROM, a RAM, and an HDD (hard disk drive). It will be noted that an SSD (solid state drive) can also be used instead of an HDD. The control device 7 also has a display control circuit, an input circuit, and communication ports not shown in the drawings. The display control circuit is a circuit that controls the display of the liquid crystal display 6. The input circuit is a circuit that imports input data that have been input by the operator via the touch panel of the liquid crystal display 6 and the operation switches 5. The communication ports are ports that enable connection to external devices such as a printer and a network such as a LAN.

The control device 7 is connected to the combination weighing unit 2, the bag-making and packaging unit 3, the film supply unit 4, the operation switches 5, and the liquid crystal display 6. The control device 7 controls the combination weighing unit 2, the bag-making and packaging unit 3, and the film supply unit 4, and outputs various types of information to the liquid crystal display 6, on the basis of input from the operation switches 5 and the liquid crystal display 6. The detailed configuration and actions of the control device 7 will be described later.

(2) CONFIGURATION OF BAG-MAKING AND PACKAGING UNIT

FIG. 2 is a perspective view showing the general configuration of the bag-making and packaging unit 3. In the following description, the six directions of "front (front-facing)," "rear (back-facing)," "up," "down," "left," and "right" are defined as shown in FIG. 2.

The bag-making and packaging unit 3 is mainly configured from a forming mechanism 13, pull-down belt mechanisms 14, a longitudinal sealing mechanism 15, and a transverse sealing mechanism 17. The forming mechanism 13 forms into a cylindrical shape a sheet-like film F that is supplied from the film supply unit 4. The pull-down belt mechanisms 14 convey downward the film F that has been formed into the cylindrical shape. The longitudinal sealing mechanism 15 seals, in the longitudinal direction parallel to the conveyance direction, the overlapping portion of both end portions of the film F that has been formed into the cylindrical shape to thereby form a cylindrical film Fc. The transverse sealing mechanism 17 seals the cylindrical film Fc in the transverse direction orthogonal to the conveyance direction to thereby form bags B whose upper end portions and lower end portions have been transversely sealed.

(2-1) Forming Mechanism

The forming mechanism 13 has a tube 13a and a former 13b. The tube 13b is an open cylinder-shaped member whose upper end and lower end are open. Contents C supplied from the combination weighing unit 2 are input to the opening in the upper end of the tube 13a. The former 13b is disposed surrounding the tube 13a. The film F that has been paid out from the film roll of the film supply unit 4 wraps around the tube 13a and is formed into the cylindrical shape when it passes through a gap between the tube 13a and the former 13b. The tube 13a and the former 13b can be replaced in accordance with the size of the bags B that are to be manufactured.

(2-2) Pull-Down Belt Mechanisms

The pull-down belt mechanisms 14 suck hold of and convey downward the film F wrapped around the tube 13a. The pull-down belt mechanisms 14 mainly have drive rollers 14a, follower rollers 14b, and a pair of belts 14c. The pair of belts 14c are disposed on both the right and left sides of the tube 13a so as to sandwich the tube 13a as shown in FIG. 2 and have mechanisms that suck hold of the film F that has been formed into the cylindrical shape. The pair of belts 14c are driven to rotate by the drive rollers 14a and the follower rollers 14b, whereby the pull-down belt mechanisms 14 convey downward the film F that has been formed into the cylindrical shape.

(2-3) Longitudinal Sealing Mechanism

The longitudinal sealing mechanism 15 seals in the longitudinal direction (the up and down direction in FIG. 2) the film F that has been formed into the cylindrical shape. The longitudinal sealing mechanism 15 is disposed on the front-facing side of the tube 13a. The longitudinal sealing mechanism 15 is moved by a drive mechanism (not shown in the drawings) in forward and rearward directions toward the tube 13a or away from the tube 13a.

When the longitudinal sealing mechanism 15 is driven by the drive mechanism toward the tube 13a, the overlapping portion in the longitudinal direction of the film F wrapped around the tube 13a becomes sandwiched between the longitudinal sealing mechanism 15 and the tube 13a. The longitudinal sealing mechanism 15 heats the overlapping portion of the film F while pushing it with a fixed pressure against the tube 13a because of the drive mechanism to thereby heat-seal the overlapping portion of the film F in the longitudinal direction and form the cylindrical film Fc. The longitudinal sealing mechanism 15 has a heater that heats the overlapping portion of the film F and a heater belt that contacts the overlapping portion of the film F.

(2-4) Transverse Sealing Mechanism

The transverse sealing mechanism 17 seals the cylindrical film Fc in the transverse direction (the right and left direction in FIG. 2). The transverse sealing mechanism 17 is disposed under the forming mechanism 13, the pull-down belt mechanisms 14, and the longitudinal sealing mechanism 15.

FIG. 3 is a general side view of the transverse sealing mechanism 17 as seen from the right side of FIG. 2. In FIG. 3, the direction perpendicular to the page is the right and left direction in FIG. 2. The transverse sealing mechanism 17 mainly has a first rotating body 50a and a second rotating body 50b. The first rotating body 50a is disposed on the front side of the cylindrical film Fc. The second rotating body 50b is disposed on the rear side of the cylindrical film Fc. Within the page of FIG. 3, the first rotating body 50a is positioned on the left side of the cylindrical film Fc, and the second rotating body 50b is positioned on the right side of the cylindrical film Fc.

The first rotating body 50a mainly has a first rotating shaft 53a, a first sealing jaw 51a, and a second sealing jaw 52a. The second rotating body 50b mainly has a second rotating shaft 53b, a first sealing jaw 51b, and a second sealing jaw 52b. The first rotating body 50a, when seen along the right and left direction, rotates about a rotational center C1 of the first rotating shaft 53a using the first rotating shaft 53a as a rotational axis. The second rotating body 50b, when seen along the right and left direction, rotates about a rotational center C2 of the second rotating shaft 53b using the second rotating shaft 53b as a rotational axis. When the transverse sealing mechanism 17 is seen along the right and left direction, the pair of first sealing jaws 51a, 51b synchronously rotate in mutually opposite directions, and the pair of second sealing jaws 52a, 52b synchronously rotate in mutually opposite directions. In FIG. 3, the paths traced by the pair of first sealing jaws 51a, 51b and the pair of second sealing jaws 52a, 52b are indicated by chain lines.

The transverse sealing mechanism 17 sandwiches, with the pair of first sealing jaws 51a, 51b or the pair of second sealing jaws 52a, 52b and along the transverse direction (the right and left direction in FIG. 2) intersecting the conveyance direction of the cylindrical film Fc, the cylindrical film Fc that is conveyed downward. The pair of first sealing jaws 51a, 51b or the pair of second sealing jaws 52a, 52b heat-seal the cylindrical film Fc in the transverse direction by sandwiching and heating the cylindrical film Fc.

(3) CONFIGURATION OF FILM SUPPLY UNIT

Figure 4:
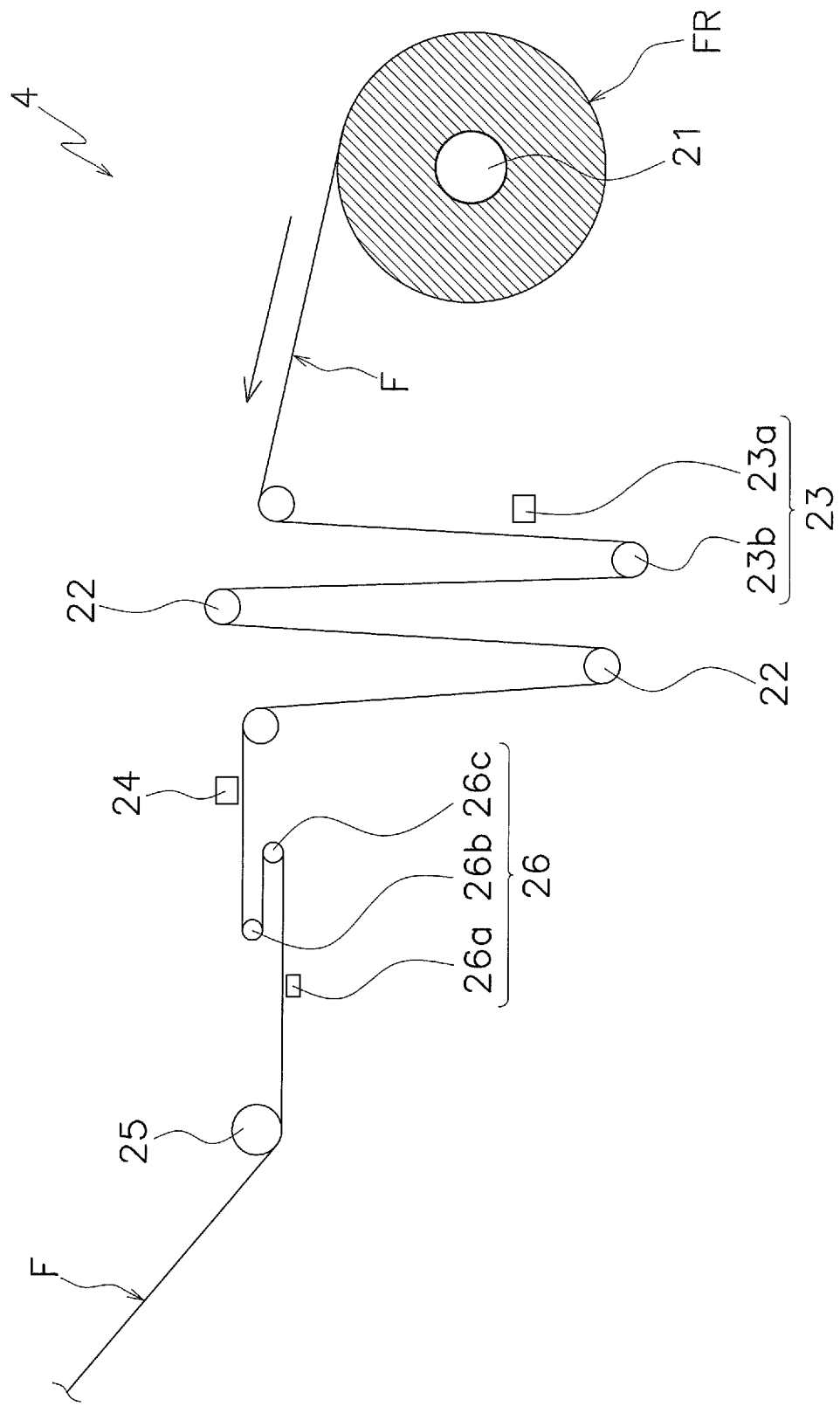
FIG. 4 is a side view showing the general configuration of a film supply unit 4.

FIG. 4 is a side view showing the general configuration of the film supply unit 4. Within the page of FIG. 4, the sheet-like film F is conveyed from the right side (upstream side) to the left side (downstream side). The film supply unit 4 pays out the film F from a film roll FR, prints predetermined information on the top surface of the film F while conveying the film F, and supplies the film F to the forming mechanism 13 of the bag-making and packaging unit 3. The film supply unit 4 mainly has an air shaft 21, plural tension rollers 22, a printing device 23, an inspection device 24, a former roller 25, and a film position correction mechanism 26.

(3-1) Air Shaft

The air shaft 21 is a shaft on which is set the film roll FR into which the sheet-like film F is wound. The air shaft 21 vacuum-sucks hold of and anchors the film roll FR. The air shaft 21 is driven to rotate by a shaft drive motor (not shown in the drawings). When the shaft drive motor rotates the air shaft 21, the sheet-like film F wound into the film roll FR is paid out.

The film F paid out from the film roll FR in the film supply unit 4 is finally delivered to the bag-making and packaging unit 3. In the bag-making and packaging unit 3, the film F is formed into the cylindrical shape by the forming mechanism 13 and is conveyed downward by the pull-down belt mechanisms 14. Because of this, in the film supply unit 4, the film F that has been paid out from the film roll FR is conveyed just the amount it has been paid out. The control device 7 can adjust the conveyance speed of the film F paid out from the film roll FR by controlling the shaft drive motor to change the rotational speed of the air shaft 21.

(3-2) Tension Rollers

The tension rollers 22 are rollers disposed in predetermined positions at predetermined distance intervals. The tension rollers 22 guide the film F to the printing device 23 while bending the film F paid out from the film roll FR and changing its conveyance angle. The tension rollers 22 apply moderate tension to the film F that is paid out from the film roll FR and conveyed and prevent slackness and meandering of the film F that is conveyed. The number and positions of the tension rollers 22 are arbitrarily settable in accordance with the position of the film roll FR and the dimensions of the film F.

At least some of the tension rollers 22 are movable in the up and down direction. By moving the tension rollers 22 in the up and down direction, the tension that acts on the film F guided by the tension rollers 22 can be adjusted. In this case, the control device 7 detects the state of tension in the film F on the basis of the amount of displacement of the tension rollers 22 in the up and down direction. Additionally, on the basis of the detected state of tension, the control device 7 controls the shaft drive motor to adjust the conveyance speed of the film F so that the tension that acts on the film F falls within a predetermined range.

(3-3) Printing Device

The printing device 23 is disposed on the upstream side of the tension rollers 22. The printing device 23 mainly has a print head 23a and a print roller 23b. The print head 23a prints predetermined printing information on the top surface of the film F that is being conveyed. The printing information is printed in a predetermined printing region on the top surface of the film F. The printing information is the date of manufacture and the expiration date of the contents C in a case where, for example, the contents C are food products. The printing information is sent from the control device 7 to the printing device 23. The print head 23a is movable so as to be pressed against the film F and moved away from the film F. However, the print head 23a is not movable along the conveyance direction of the film F.

The print roller 23b is a roller disposed opposing the print head 23a. The film F that is conveyed passes between the print head 23a and the print roller 23b. The print roller 23b finely adjusts the position of the film F so that the print head 23a opposes the top surface of the film F. Because of this, the print head 23a can print the printing information so that it fits in the printing region of the film F that is conveyed. The position of the print head 32a is manually adjustable in the width direction of the film F. The position of the print roller 23b is manually adjustable in the up and down direction.

(3-4) Inspection Device

The inspection device 24 is installed in the neighborhood of the downstream side of the printing device 23. The inspection device 24 inspects whether or not the printing information has been accurately printed in the printing region of the film F. The inspection device 24 is a photosensor configured from a light-emitting element and a light-receiving element. The film F that is conveyed passes between the light-emitting element and the light-receiving element. The light-emitting element emits light to the printing region of the film F. The light-receiving element detects the light reflected by the printing region and detects the position of the printing information printed in the printing region.

It will be noted that the inspection device 24 can also be an optical camera. In this case, the inspection device 24 inspects whether or not the printing information has been accurately printed in the printing region by capturing an image of the printing region of the film F that is conveyed and analyzing the acquired image.

(3-5) Former Roller

The former roller 25 is a roller disposed in the closest position to the former 13b. The former roller 25 is a roller for guiding in a predetermined direction the film F that is conveyed in the film supply unit 4. Specifically, the former roller 25 has the role of regulating the final conveyance angle of the film F supplied to the former 13b to inhibit misalignment and sagging of the film F on the former 13b.

The film supply unit 4 shown in FIG. 4 has one former roller 25. The number and position of the former roller 25 are arbitrarily settable in accordance with the configuration of the film supply unit 4. The position of the former roller 25 is manually adjustable.

(3-6) Film Position Adjustment Mechanism

The film position adjustment mechanism 26 is disposed between the tension rollers 23 and the former roller 25. The film position adjustment mechanism 26 detects positional misalignment in the width direction of the film F that is being conveyed in the film supply unit 4 and, in a case where positional misalignment is occurring, automatically adjusts the width direction position of the film F. The film position adjustment mechanism 26 mainly has a film position sensor 26a, a first position adjustment roller 26b, and a second position adjustment roller 26c.

The film position sensor 26a detects positional misalignment in the width direction of the film F. FIG. 5 is a drawing for describing the mechanism by which the film position sensor 26a detects positional misalignment. FIG. 5 is a drawing in which the film position sensor 26a is seen along the conveyance direction of the film F. The film position sensor 26a has a first light-emitting element 26d1, a second light-emitting element 26d2, a first light-receiving element 26e1, and a second light-receiving element 26e2. The first light-receiving element 26e1 is installed in a position where it can detect the light emitted from the first light-emitting element 26d1 in a case where the film F is not present between the first light-emitting element 26d1 and the first light-receiving element 26e1. The second light-receiving element 26e2 is installed in a position where it can detect the light emitted from the second light-emitting element 26d2 in a case where the film F is not present between the second light-emitting element 26d2 and the second light-receiving element 26e2.

In a case where there is no positional misalignment in the width direction of the film F, as shown in FIG. 5, the film position sensor 26a is installed in a position where the film F is present between the first light-emitting element 26d1 and the first light-receiving element 26e1 and where the film F is not present between the second light-emitting element 26d2 and the second light-receiving element 26e2. In this case, the first light-receiving element 26e1 cannot detect the light emitted from the first light-emitting element 26d1, and the second light-receiving element 26e2 can detect the light emitted from the second light-emitting element 26d2.

In a case where there is positional misalignment in the width direction of the film F, the first and second light-receiving elements 26e1, 26e2 can detect the light emitted from the first and second light-emitting elements 26d1, 26d2. Alternatively, in a case where there is positional misalignment in the width direction of the film F, the first and second light-receiving elements 26e1, 26e2 cannot detect the light emitted from the first and second light-emitting elements 26d1, 26d2. Because of this, the control device 7 can detect positional misalignment in the width direction of the film F on the basis of the detection signal of the film position sensor 26a. The position of the film position sensor 26a is manually adjustable in the width direction of the film F.

Figure 6A:
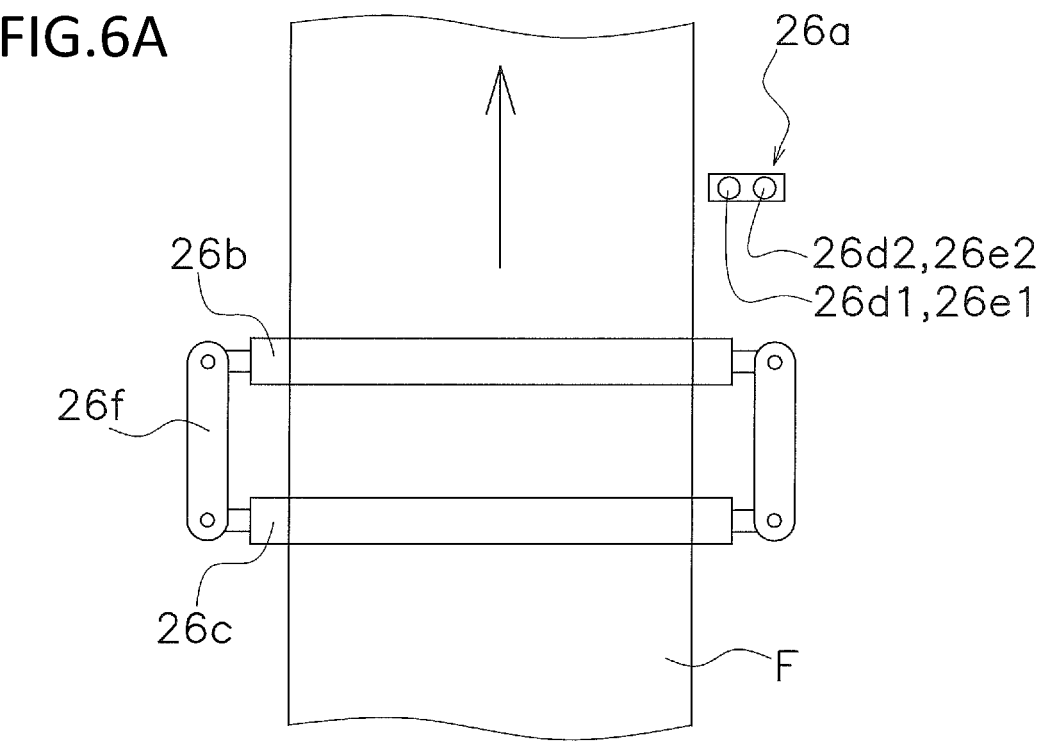
FIG. 6A and FIG. 6B are drawings for describing how the width direction position of film F differs in accordance with the shape of a link 26f In the state shown in FIG. 6A, positional misalignment in the width direction of the film F is occurring. In the state shown in FIG. 6B, positional misalignment in the width direction of the film F is not occurring.
Figure 6B:
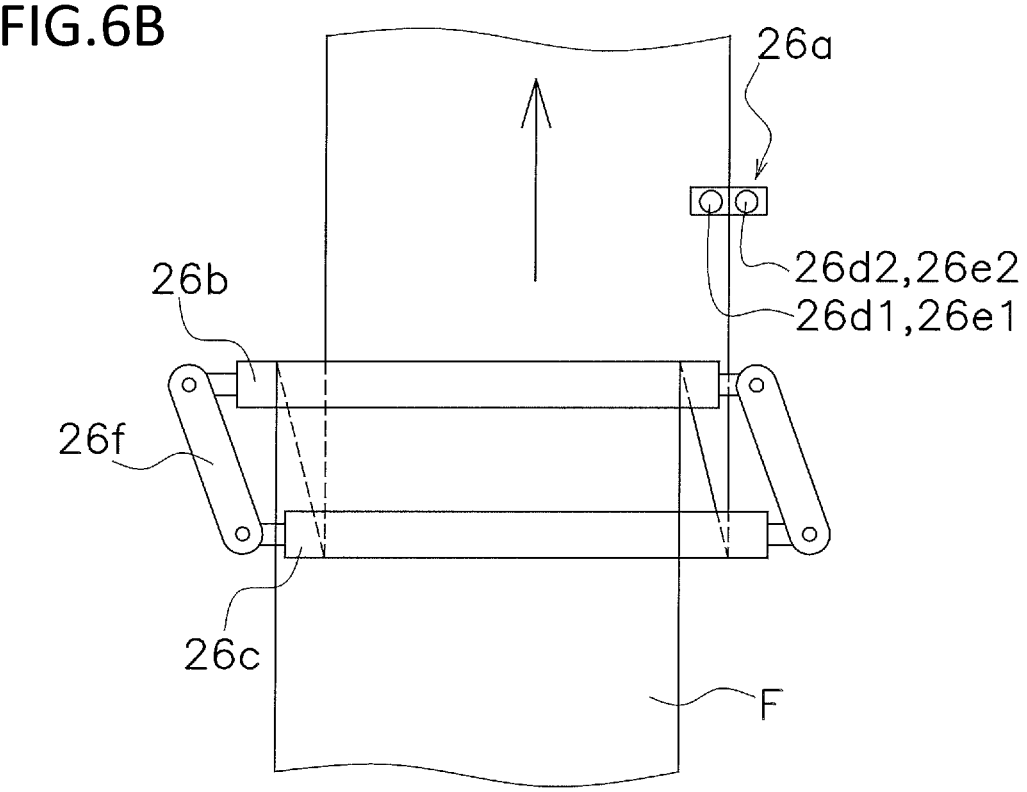

The first position adjustment roller 26b and the second position adjustment roller 26c are a pair of rolls supported by a parallelogram link 26f. The control device 7 changes the shape of the link 26f to thereby adjust the positions of the first position adjustment roller 26b and the second position adjustment roller 26c on the basis of the detection signal of the film position sensor 26a. Because of this, the control device 7 can finely adjust the width direction position of the film F. FIG. 6A and FIG. 6B are drawings for describing how the width direction position of the film F differs in accordance with the shape of the link 26f. FIG. 6A and FIG. 6B are top views of the film F that is conveyed. In the state shown in FIG. 6A, the first and second light-receiving elements 26e1, 26e2 of the film position sensor 26a can detect the light emitted from the first and second light-emitting elements 26d1, 26d2, so positional misalignment in the width direction of the film F is occurring. In the state shown in FIG. 6B, the first light-receiving 26e1 cannot detect the light emitted from the first light-emitting element 26d1, but the second light-receiving element 26e2 can detect the light emitted from the second light-emitting element 26d2, so positional misalignment in the width direction of the film F is not occurring. When the control device 7 detects positional misalignment in the width direction of the film F in the state shown in FIG. 6A, it changes the shape of the link 26f to thereby finely adjust the width direction position of the film F to the state shown in FIG. 6B. Specifically, the control device 7 changes the shape of the link 26f so that the second position adjustment roller 26c moves slightly rightward.

(4) CONFIGURATION OF CONTROL DEVICE

Figure 7:
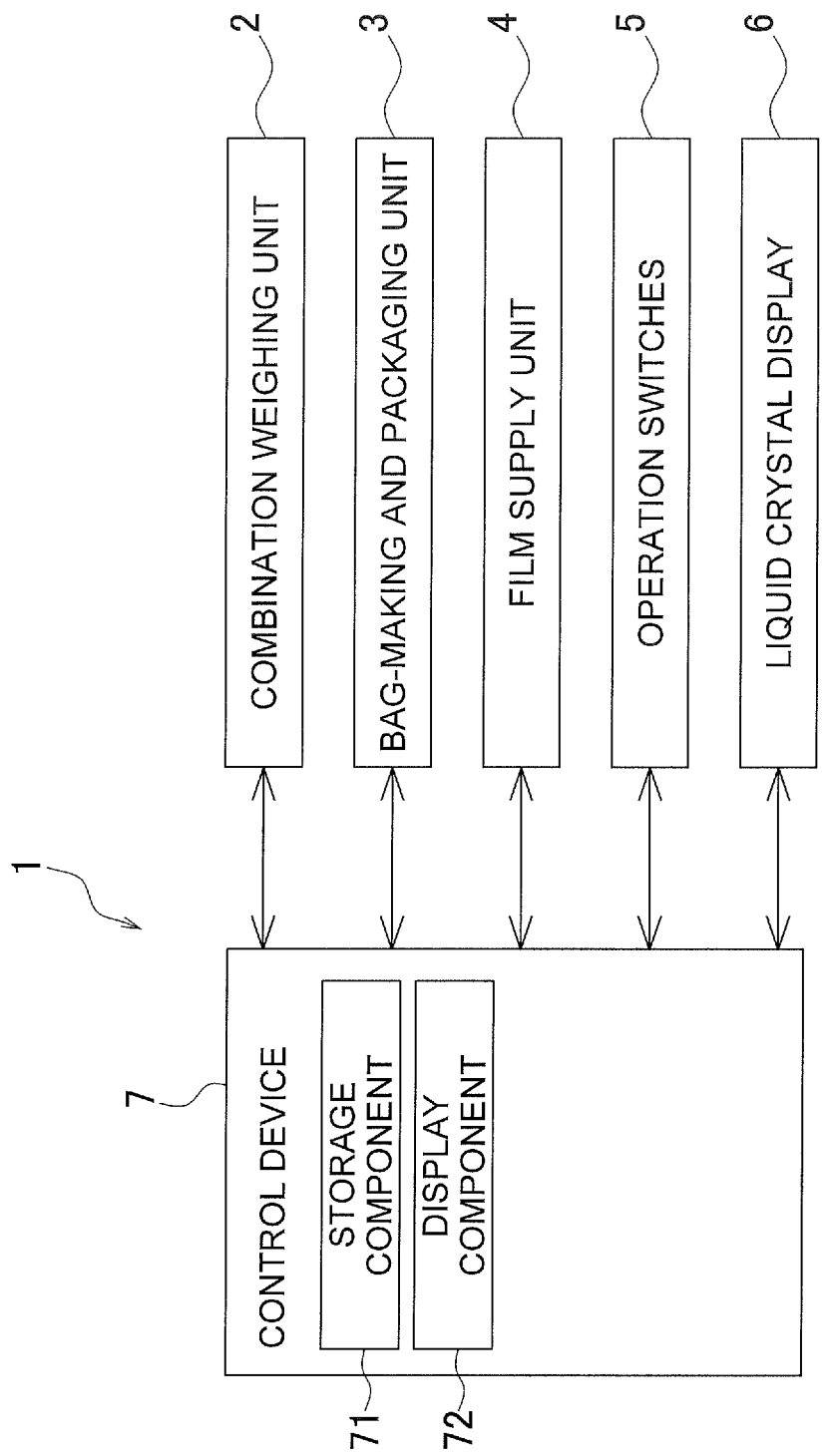
FIG. 7 is a block diagram of the bag-making and packaging machine 1.

The control device 7 has a notification function of notifying the user of the bag-making and packaging machine 1 of mechanisms requiring manual adjustment when switching a setting relating to the packaging of the contents C. FIG. 7 is a block diagram of the bag-making and packaging machine 1. The control device 7 mainly has a storage component 71 and a display component 72. The storage component 71 and the display component 72 are programs stored in the control device 7 and executed by the control device 7. The storage component 71 and the display component 72 realize the notification function of the control device 7.

The storage component 71 stores settings (packaging settings) relating to the packaging of the contents C. The packaging settings are, for example, packaging capacity and bag dimensions. The packaging capacity is the number of bags B in which the contents C have been packaged that the bag-making and packaging machine 1 can manufacture in one minute. The bag dimensions are, for example, the width and length of the bags B in which the contents C become packaged. Usually the packaging capacity and the bag dimensions differ depending on the type of the contents C, so the storage component 71 stores packaging settings appropriate for each type of the contents C. In this case, it is necessary to switch the packaging setting when changing the contents C that are targets to be packaged by the bag-making and packaging machine 1. Furthermore, the storage component 71 can also store more than one different packaging setting with respect to the same type of the contents C. For example, in a case where there is more than one type of bag B for packaging the contents C, it is necessary to switch the packaging setting when switching the film F serving as the material of the bags B.

The display component 72 displays on the liquid crystal display 6 a switching screen for switching the packaging setting. FIG. 8 is an example of the switching screen displayed on the liquid crystal display 6. The switching screen of FIG. 8 is configured from a current setting area A1, a reservation list area A2, and an input area A3.

In FIG. 8, a database DB including four packaging settings stored in the storage component 71 is displayed in the reservation list area A2 of the switching screen. The database DB retains each of the four packaging settings as records R1 to R4. Each of the records R1 to R4 retains "reservation number," "date and time," "product name," "capacity," "bag width," and "bag length" keys. The "reservation number" key is the main key of the records R1 to R4. The "date and time" key is the time when the records R1 to R4 were created or updated. The "product name" key is a character string specifically indicating the contents C. The "capacity" key is the number of bags B manufactured per minute (bpm; bags per minute). The "bag width" key is the width (mm) of the bags B and the width (mm) of the film F. The "bag length" key is the length (mm) of the bags B.

In FIG. 8, the current packaging setting is displayed in the current setting area A1 of the switching screen. In FIG. 8, record 1, whose "reservation number" key value is 4, is displayed as the current packaging setting.

In FIG. 8, various buttons that the user can touch are displayed in the input area A3 of the switching screen. In FIG. 8, a "Switch" button 72a is displayed. The "Switch"

button 72a is invalid (displayed with hatching) as shown in FIG. 8 in a case where none of the packaging settings being displayed in the reservation list area A2 has been selected. However, when the user touches any one of the packaging settings being displayed in the reservation list area A2 in the state shown in FIG. 8, the packaging setting that has been touched is selected and the "Switch" button 72a becomes valid as shown in FIG. 9. FIG. 9 is an example of the switching screen in a state in which the "Switch" button 72a is valid. In FIG. 9, the packaging setting of record R3, whose "reservation number" key value is 1, is selected. As shown in FIG. 9, the record R3 that has been selected is displayed on the liquid crystal display 6 in a manner different from the other records. When the user touches the "Switch" button 72a in the state shown in FIG. 9, the control device 7 performs a switching process that switches the current packaging setting from the record R1 to the record R3.

Figure 10:
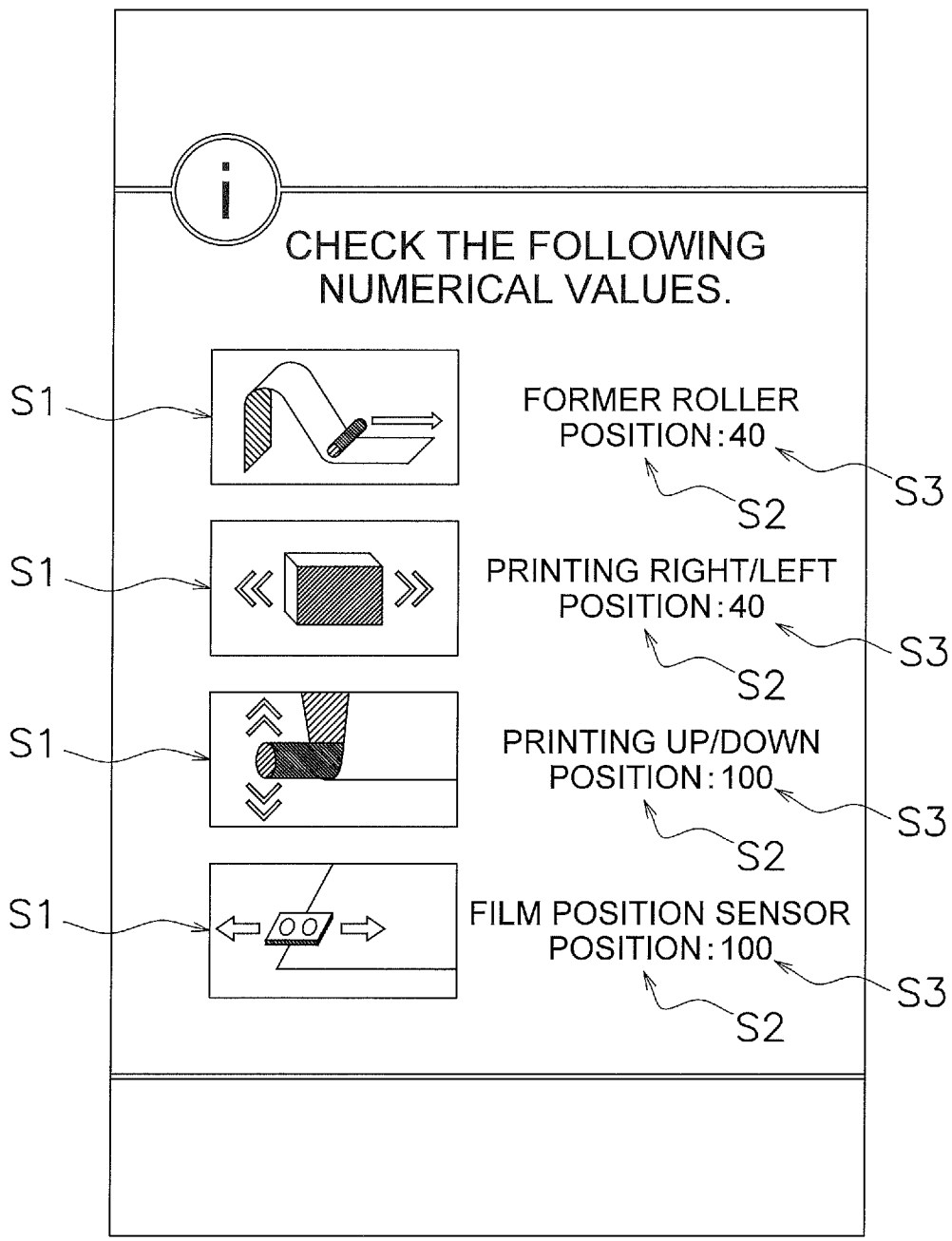
FIG. 10 is an example of the switching screen in which information relating to adjustment-requiring parts is displayed.

Furthermore, in the process of switching the packaging setting, the display component 72 displays on the liquid crystal display 6 information relating to adjustment-requiring parts of the bag-making and packaging machine 1. The adjustment-requiring parts are parts or mechanisms that the user of the bag-making and packaging machine 1 needs to manually adjust when switching the packaging setting. Specifically, when the "Switch" button 72a is touched in the state shown in FIG. 9, the display component 72 displays on the liquid crystal display 6 information relating to the adjustment-requiring parts. FIG. 10 is an example of the switching screen in which the information relating to the adjustment-requiring parts is displayed. In this embodiment, the adjustment-requiring parts of the bag-making and packaging machine 1 are "Position of Former Roller," "Printing Right/Left Position," "Printing Up/Down Position," and "Film Position Sensor Position." In FIG. 10, an icon S1, a character string S2, and an adjustment amount S3 are displayed for each adjustment-requiring part under the message "Check the following numerical values." The icons S1 and the character strings S2 represent the adjustment-requiring parts. The adjustment amounts S3 are setting values after adjusting the adjustment-requiring parts. The adjustment amounts S3 are, for example, distances (mm) from reference positions. For example, in FIG. 10, the adjustment amount S3 of "Position of Former Roller" is displayed as "40." This means that the user needs to adjust the position of the former roller to 40 in the process of switching the packaging setting.

Each of the adjustment-requiring parts shown in FIG. 10 will be described. "Position of Former Roller" is the position of the former roller 25 in the conveyance direction of the film F. In a case where it is necessary to replace the former 13b as a result of switching the packaging setting, it is necessary to change the position of the former roller 25 to match the new former 13b. "Printing Right/Left Position" is the position of the print head 23a of the printing device 23 in the width direction of the film F. "Printing Up/Down Position" is the up and down direction position of the print roller 23b of the printing device 23. "Printing Right/Left Position" and "Printing Up/Down Position" are the position of the printing information that is printed on the film F that is conveyed. "Film Position Sensor Position" is the position of the film position sensor 26a in the width direction of the film F.

Figure 11:
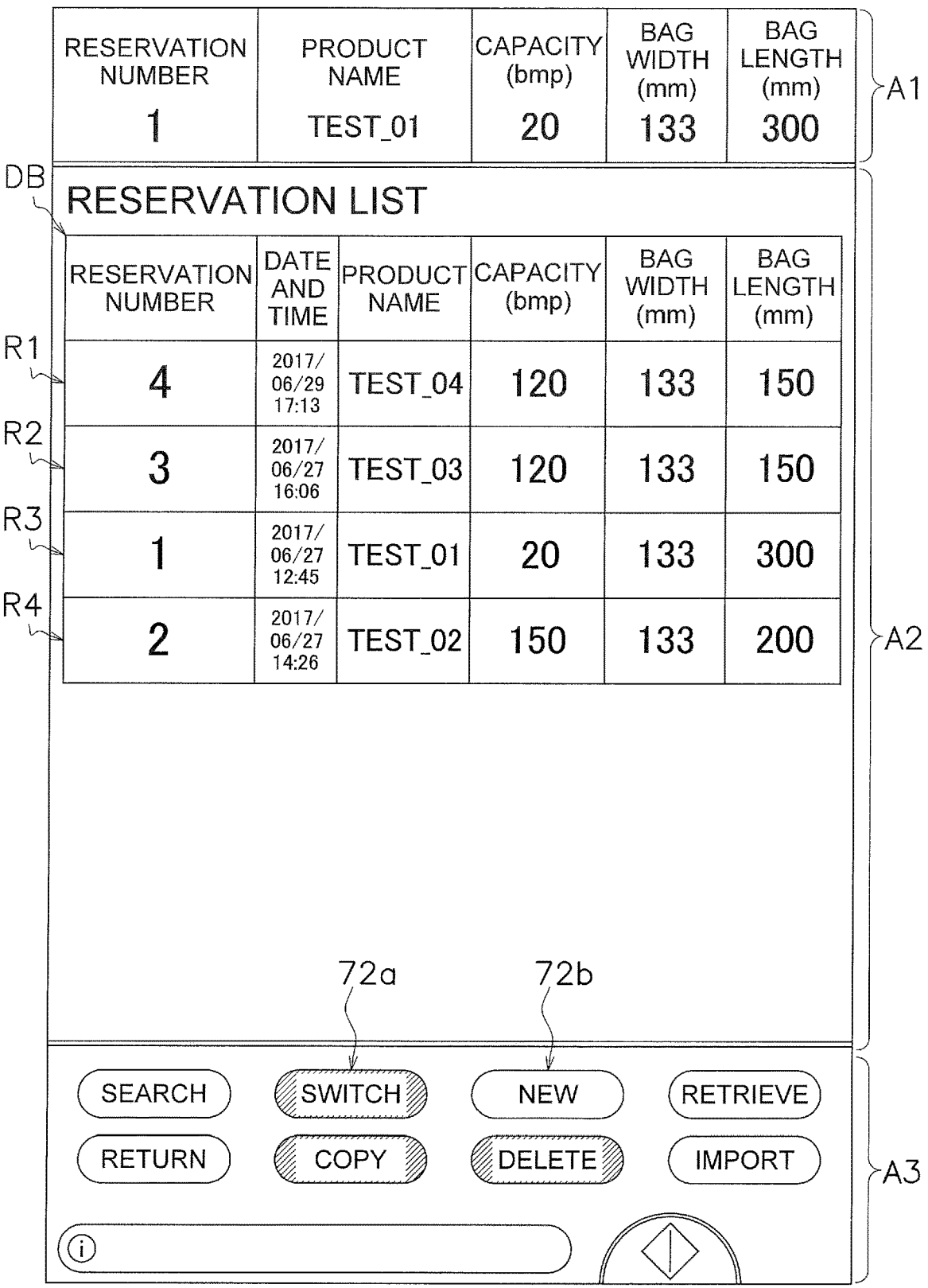
FIG. 11 is an example of the switching screen displayed on the liquid crystal display 6 after switching a packaging setting.

After the information relating to the adjustment-requiring parts is displayed on the liquid crystal display 6 as shown in FIG. 10, the user manually adjusts each of the adjustment-requiring parts in accordance with the information displayed in FIG. 10. When the user touches an arbitrary place on the screen of the liquid crystal display 6 after having adjusted each of the adjustment-requiring parts, the information relating to the adjustment-requiring parts can be erased from the screen of the liquid crystal display 6. Because of this, the action of switching the packaging setting by the user is completed. FIG. 11 is an example of the switching screen displayed on the liquid crystal display 6 after the action of switching the packaging setting has been completed. In FIG. 11, the record R3, whose "reservation number" key value is 1, is displayed in the current setting area A1 of the switching screen as the current packaging setting.

(5) ACTIONS OF BAG-MAKING AND PACKAGING MACHINE

An overview of the actions by which the bag-making and packaging machine 1 seals the contents C in the bags B will be described. The film F that has been supplied from the film supply unit 4 to the bag-making and packaging unit 3 is wrapped around the tube 13a and formed into a cylindrical shape, and is conveyed downward by the pull-down belt mechanisms 14. Both end portions—extending in the up and down direction—of the cylindrical film F wrapped around the tube 13a are overlapped on top of each other. The overlapping portion of the film F that has been formed into the cylindrical shape is sealed in the longitudinal direction by the longitudinal sealing mechanism 15, whereby the cylindrical film Fc is formed.

The cylindrical film Fc that has been longitudinally sealed comes off the tube 13a and is conveyed downward to the transverse sealing mechanism 17. The transverse sealing mechanism 17 uses the pair of first sealing jaws 51a, 51b or the pair of second sealing jaws 52a, 52b to sandwich the cylindrical film Fc and transversely seal it. At this time, under the transversely sealed portion of the cylindrical film Fc, the bag B in which the contents C have been sealed is formed. At the same time, above the transversely sealed portion of the cylindrical film Fc, the contents C that have been weighed by the combination weighing unit 2 drop through the inside of the tube 13a and are input to the cylindrical film Fc.

Furthermore, in accordance with the timing when the cylindrical film Fc is transversely sealed, the transversely sealed portion of the cylindrical film Fc is cut in the transverse direction by a cutter (not shown in the drawings) built into the first sealing jaw 51a or the second sealing jaw 52a. Because of this, the bag B in which the contents C have been sealed is cut away from the subsequent cylindrical film Fc.

In the way described above, the bags B in which the contents C have been sealed are continuously manufactured. The manufactured bags B are thereafter transferred by a belt conveyor (not shown in the drawings) or the like to devices such as a thickness checker and a weight checker.

(6) CHARACTERISTICS

The bag-making and packaging machine 1 has the function of displaying on the liquid crystal display 6 as shown in FIG. 10 and notifying the user of the information relating to the adjustment-requiring parts that are parts requiring manual adjustment when switching the setting relating to the packaging of the contents C. Consequently, the bag-making and packaging machine 1 has the function of preventing the user from forgetting to adjust adjustment-requiring parts that are parts that need to be manually adjusted when switching a setting relating to the packaging of products.

Furthermore, the bag-making and packaging machine 1 displays on the liquid crystal display 6 the new setting values (adjustment amounts) for the adjustment-requiring parts as the information relating to the adjustment-requiring parts when switching the setting relating to the packaging of the contents C. For that reason, the user performing the adjustment of the adjustment-requiring parts no longer needs a memo or the like in which the new setting values are written down, so the user can efficiently perform the work of switching the setting relating to the packaging of the contents C.

(7) EXAMPLE MODIFICATIONS

An embodiment of the invention has been described above, but the invention is not limited to the above embodiment and can be changed in various ways in a range that does not depart from the spirit of the invention.

(7-1) Example Modification A

In the embodiment, the control device 7 of the bag-making and packaging machine 1 has the notification function of notifying the user of the information relating to the adjustment-requiring parts when switching the packaging setting. The control device 7 has the storage component 71 and the display component 72 that are programs for realizing the notification function. However, the control device 7 can also have programs, in addition to the storage component 71 and the display component 72, for realizing the notification function.

Figure 12:
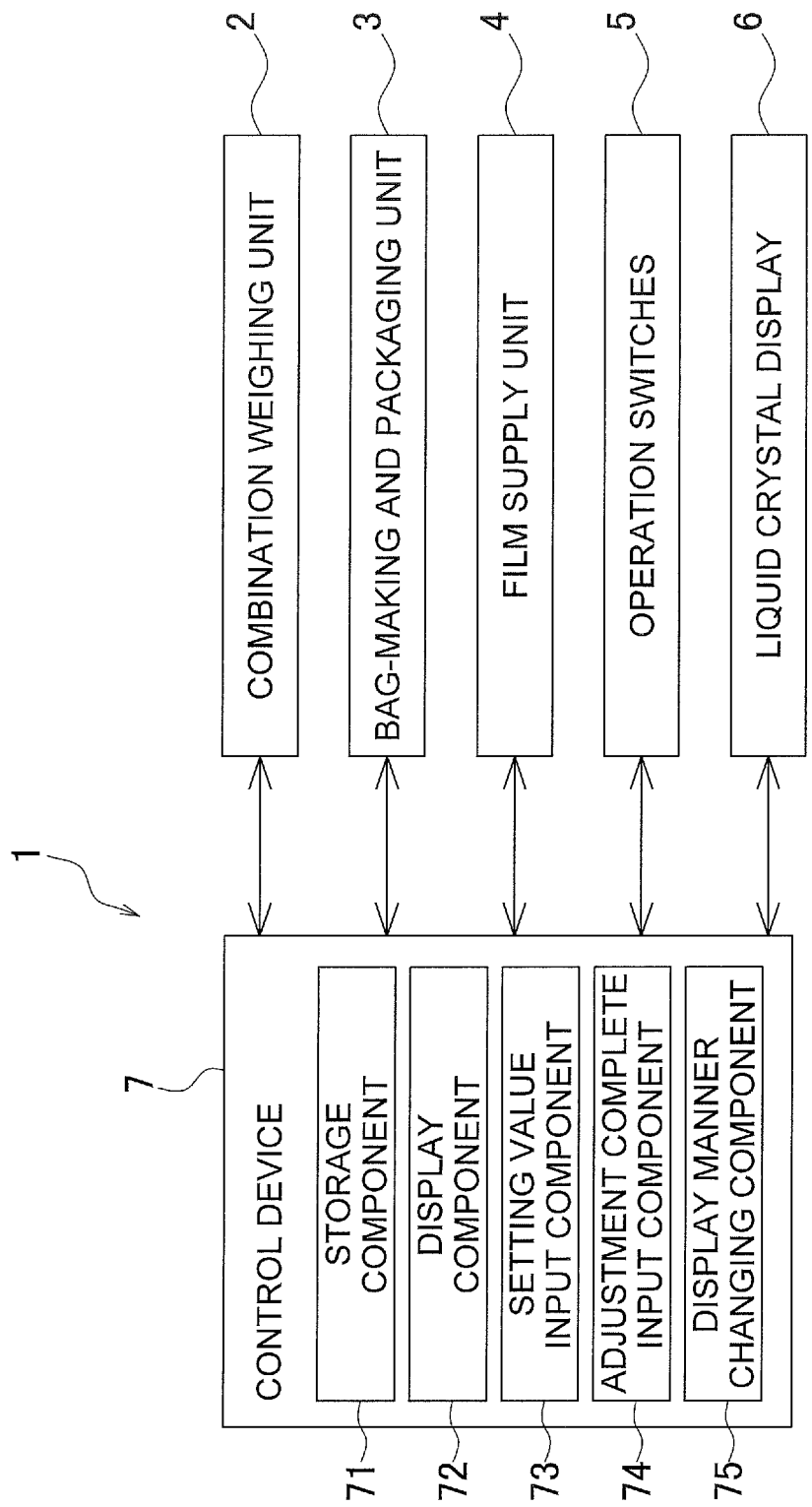
FIG. 12 is a block diagram of the bag-making and packaging machine 1 in example modification A.

FIG. 12 is a block diagram of the bag-making and packaging machine 1 of this example modification. In FIG. 12, the control device 7 mainly has the storage component 71, the display component 72, a setting value input component 73, an adjustment complete input component 74, and a display manner changing component 75. These are programs stored in the control device 7 and executed by the control device 7. It will be noted that in this example modification the control device 7 does not need to have all of the setting value input component 73, the adjustment complete input component 74, and the display manner changing component 75, and it suffices for the control device 7 to have at least one of these. Next, the functions of each of the setting value input component 73, the adjustment complete input component 74, and the display manner changing component 75 will be described.

Figure 13:
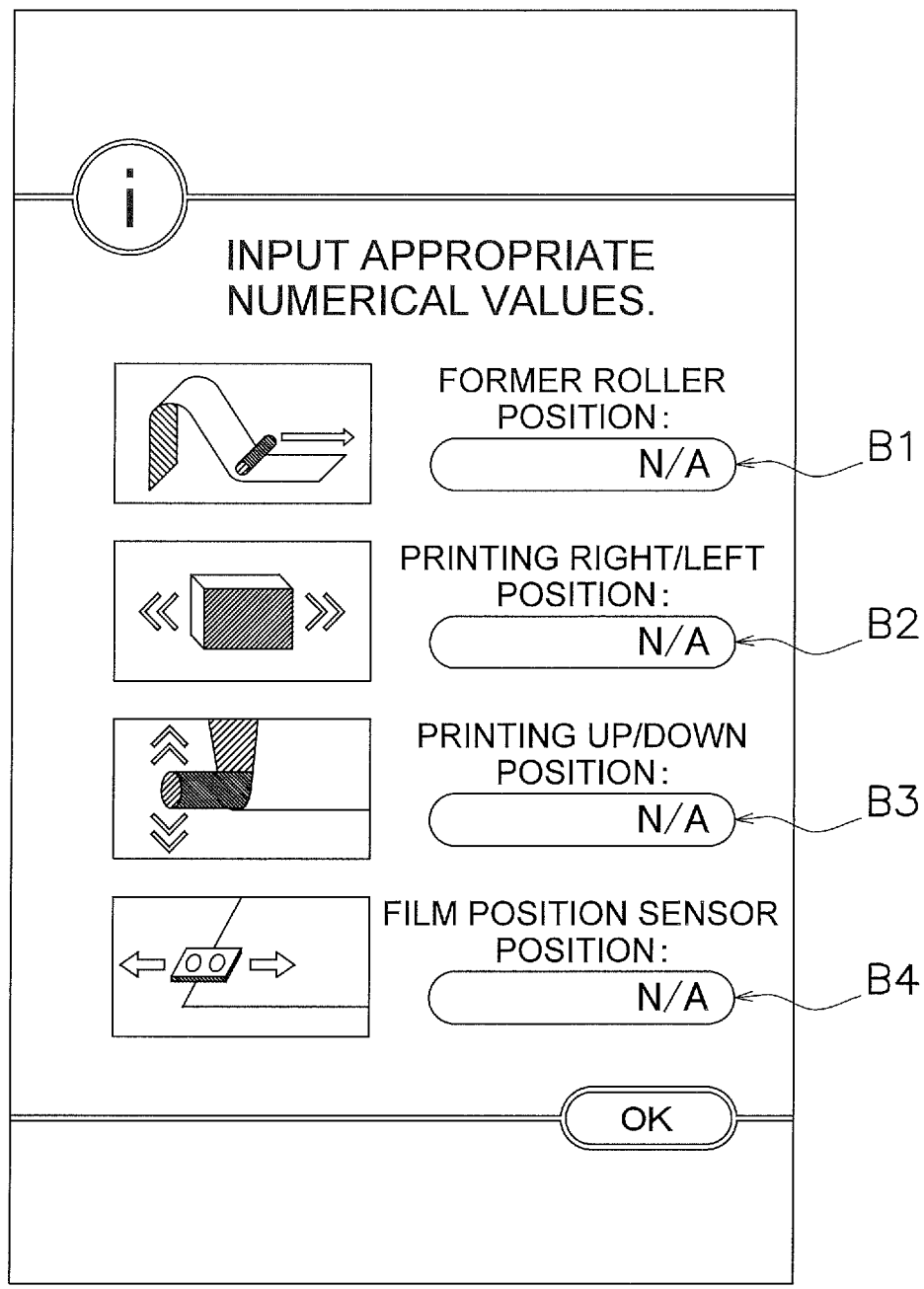
FIG. 13 is a drawing for describing the function of a setting value input component 73 in example modification A.

The setting value input component 73 realizes a function for inputting adjustment amounts for the adjustment-requiring parts per packaging setting. For example, when registering (reserving) a new packaging setting, the user can input beforehand the adjustment amounts for the adjustment-requiring parts suitable for the registered packaging setting. FIG. 13 is a drawing for describing the function of the setting value input component 73. When the user touches a "New" button 72b displayed on the switching screen of FIG. 9, the control device 7 creates and stores in the storage component 71 a new record to which a new reservation number has been assigned. At that time, the user inputs values for each of the "Product Name," "Capacity," "Bag Width," and "Bag Length" keys in the new record. Furthermore, the user can input adjustment amounts for the adjustment-requiring parts suitable for the packaging setting in the new record. FIG. 13 is an example of an input screen for inputting adjustment amounts for the adjustment-requiring parts. The screen of FIG. 13 has substantially the same configuration as the screen of FIG. 10. However, on the screen of FIG. 13, input boxes B1 to B4 for inputting the adjustment amounts are displayed. The default value in the input boxes B1 to B4 is "N/A," which indicates that an adjustment amount has not been input. When the user touches the input boxes B1 to B4, numeric keys for inputting numerical values, for example, are displayed on the liquid crystal display 6. The user can operate the screen of FIG. 13 to input adjustment amounts for each of the adjustment-requiring parts and store them in the storage component 71. Because of this work, when the user switches to the newly registered packaging setting, the user can perform the work of adjusting the adjustment-requiring parts while checking the screen of FIG. 10 on which are displayed the adjustment amounts for each of the adjustment-requiring parts that the user input when registering that packaging setting. Consequently, the user of the bag-making and packaging machine 1 can, using the function of the setting value input component 73, make the appropriate adjustments without referring to a memo or the like even if the user forgets the setting values relating to the parts requiring manual adjustment.

Figure 14:
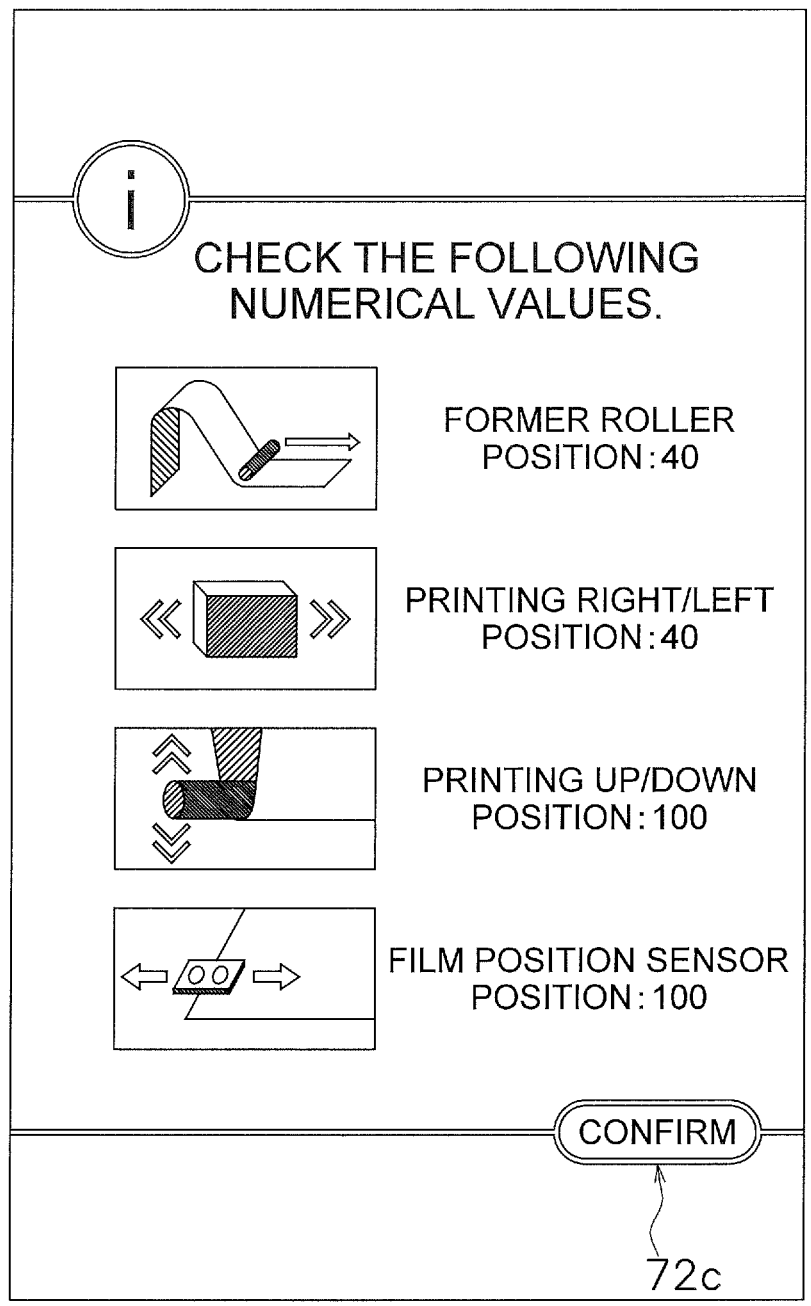
FIG. 14 is a drawing for describing the function of an adjustment complete input component 74 in example modification A.

The adjustment complete input component 74 realizes a function for the user to inform the control device 7 that the user has completed the adjustment of the adjustment-requiring parts. FIG. 14 is a drawing for describing the function of the adjustment complete input component 74. FIG. 14 shows a screen displayed on the liquid crystal display 6 that is the same as the one in FIG. 10. However, on the screen of FIG. 14, a "Confirm" button 72c not displayed on the screen of FIG. 10 is displayed. The "Confirm" button 72c is a button that the user touches after the user has completed the work of manually adjusting the adjustment-requiring parts. By touching the "Confirm" button 72c, the user can relay to the control device 7 that the user has completed the work of adjusting the adjustment-requiring parts and can confirm the adjustment work. Because of this, the control device 7 can start the process of packaging the contents C after the work of adjusting the adjustment-requiring parts by the user has been reliably completed. That is, the adjustment complete input component 74 can prevent the bag-making and packaging machine 1 from starting the process of packaging the contents C before the work of adjusting the adjustment-requiring parts that is necessary when switching the packaging setting is completed. It will be noted that instead of the "Confirm" button 72c displayed on the screen of the liquid crystal display 6, the user can also push a physical button of the operation switches 5 or the like to thereby relay to the control device 7 that the user has completed the work of adjusting the adjustment-requiring parts and confirm the adjustment work.

The display manner changing component 75 realizes the function of displaying on the liquid crystal display 6, in a manner different from the adjustment-requiring parts for which manual adjustment has not been completed, the adjustment-requiring parts for which manual adjustment has been completed when switching the packaging setting. FIG. 15 is a drawing for describing the function of the display manner changing component 75. FIG. 15 shows a screen displayed on the liquid crystal display 6 that is the same as the one in FIG. 10. However, on the screen of FIG. 15, check boxes 72d1 to 72d4 are displayed on the left side of the icons for each of the adjustment-requiring parts. For example, the check box 72d1 is displayed on the left side of the icon for "Position of Former Roller." Initially, all the check boxes 72d1 to 72d4 are unchecked. By touching, for example, check box 72d1 when the user has completed adjustment of "Position of Former Roller," the user can check the check box 72d1. In the screen of FIG. 15, only the check box 72d1 is checked. Because of this, in a case where there is more than one adjustment-requiring part, the control device 7 can distinguish between, and display on the liquid crystal display 6, the adjustment-requiring parts for which manual adjustment has been completed and the adjustment-requiring parts for which manual adjustment has not been completed. Consequently, the control device 7 can display, in a way that is easy to understand on the liquid crystal display 6, the state of progress of the adjustment work when switching the packaging setting, so the adjustment work of the user can be made efficient.

It will be noted that in a case where the control device 7 has both the adjustment complete input component 74 and the display manner changing component 75, the control device 7 can also validate the "Confirm" button 72c only when all the check boxes 72d1 to 72d4 have been checked. In this case, the user cannot complete the work of adjusting the adjustment-requiring parts until the user checks all the check boxes 72d1 to 72d4.

(7-2) Example Modification B

In the embodiment, as shown in FIG. 10, when switching the packaging setting, the display component 72 displays on the liquid crystal display 6 the information relating to the adjustment-requiring parts requiring manual adjustment in the bag-making and packaging machine 1. In this case, when switching the packaging setting, the display component 72 can also display, in a manner different from other of the adjustment-requiring parts, the adjustment-requiring parts for which the adjustment amounts differ between before the switch and after the switch.

FIG. 16 is a drawing for describing the function of the display component 72 in this example modification. FIG. 16 shows an example of a screen displayed on the liquid crystal display 6 that is the same as the one in FIG. 10. However, in FIG. 16, "Printing Right/Left Position" and "Printing Up/Down Position" are displayed in a manner different from "Position of Former Roller" and "Film Position Sensor Position." Specifically, in FIG. 16, "Printing Right/Left Position" and "Printing Up/Down Position" are not displayed. In this case, "Printing Right/Left Position" and "Printing Up/Down Position" have the same adjustment amounts before and after switching the packaging setting, so they are adjustment-requiring parts that the user does not need to manually adjust. In contrast, "Position of Former Roller" and "Film Position Sensor Position" have different adjustment amounts before and after switching the packaging setting, so they are adjustment-requiring parts that the user needs to manually adjust. For that reason, the display component 72 displays "Position of Former Roller" and "Film Position Sensor Position" on the liquid crystal display 6 in such a way that they are more conspicuous than "Printing Right/Left Position" and "Printing Up/Down Position." For example, the display component 72 faintly displays, or does not display, "Printing Right/Left Position" and "Printing Up/Down Position." In this way, the display component 72 can, by emphasizing and displaying on the liquid crystal display 6 only the adjustment-requiring parts that the user needs to manually adjust, notify the user of parts requiring manual adjustment in a way that is easy to understand.

(7-3) Example Modification C

In the embodiment, the bag-making and packaging machine 1 for packaging in the film F and bag packing the contents C such as food products was described as the product processing apparatus pertaining to the invention. However, the product processing apparatus pertaining to the invention can also be an apparatus other than the bag-making and packaging machine 1. For example, the product processing apparatus pertaining to the invention can also be a box packing apparatus for packing, into cardboard boxes, bags in which food products have been packaged. In this case also, the control device of the box packing apparatus has the function of displaying on the liquid crystal display 6 and notifying the user of information relating to adjustment-requiring parts that are parts requiring manual adjustment when switching a setting relating to the box packing. Consequently, the box packing apparatus of this example modification has the function of preventing the user from forgetting to adjust adjustment-requiring parts that are parts that need to be manually adjusted when switching a setting relating to the box packing.

The product processing apparatus pertaining to the invention is useful because it has the function of preventing a user from forgetting to adjust parts that need to be manually adjusted when switching a setting.

REFERENCE SIGNS LIST

1 Bag-making and Packaging Machine (Product Processing Apparatus)
4 Film Supply Unit (Conveyance Unit)
22 Tension Rollers (Roller)
23 Printing Device (Printing Unit)
71 Storage Component
72 Display Component
73 Setting Value Input Component
74 Adjustment Complete Input Component
75 Display Manner Changing Component
C Contents (Products)

The invention claimed is:

1. A product processing apparatus that performs packaging of products, the product processing apparatus comprising:
 a control device including an input circuit configured to store setting values relating to the packaging of the products; and
 a display configured to display a plurality of adjustment-requiring parts that require a movement performed manually by a user of the apparatus in the apparatus when switching a current packaging setting to a next packaging setting,
 the control device further configured to display information for each of the plurality of adjustment-requiring parts on the display, the information including
 icons and character strings that represent the adjustment-requiring parts and
 setting values to which the adjustment-requiring parts are to be manually adjusted by the user.

2. The product processing apparatus according to claim 1, wherein when changing the settings, the display is further configured to display setting values for the adjustment-requiring parts after change in the settings.

3. The product processing apparatus according to claim 2, wherein the control device is further configured to input the setting values per each of the settings.

4. The product processing apparatus according to claim 2, wherein when changing the settings, the display is further configured to display the adjustment-requiring parts for which the setting values differ between before changing and after changing the settings in a manner different from others of the adjustment-requiring parts.

5. The product processing apparatus according to claim 1, wherein the control device is further configured to input that an adjustment of the adjustment-requiring parts has been completed.

6. The product processing apparatus according to claim 1, wherein the control device is further configured to cause the display to display the adjustment-requiring parts for which adjustment has been completed when changing the settings in a manner different from the adjustment-requiring parts for which adjustment has not been completed.

7. The product processing apparatus according to claim 1, wherein
- the product processing apparatus is an apparatus that packages the products in film,
- the product processing apparatus has
  - a conveyance unit configured to convey the film in a longitudinal direction thereof,
  - a roller configured to guide the film that is being conveyed, and
  - a printing unit configured to print predetermined information on the film that is being conveyed, and
- the display is further configured to display as the adjustment-requiring parts, at least one of a position of the roller, a width direction position of the film that is being conveyed, and a position where the printing unit prints on the film.

8. A control device for a product processing apparatus that performs packaging of products comprising:
- an input circuit configured to store setting values relating to the packaging of the products; and
- a display control circuit configured to display adjustment-requiring parts that require a movement performed manually by a user of the apparatus in the apparatus when switching a current packaging setting to a next packaging setting,
- wherein the control device is configured to display the setting values on a display such that the adjustment-requiring parts are to be manually adjusted by the user.

\* \* \* \* \*